United States Patent [19]

Nakatsukasa et al.

[11] 4,060,851
[45] Nov. 29, 1977

[54] CONTROL SYSTEM OF A NUMERICAL CONTROL UNIT

[75] Inventors: Kazuo Nakatsukasa; Kazuo Murata; Tetsuo Ohkubo; Masayoshi Yurugi; Shinobu Takahashi, all of Tokyo, Japan

[73] Assignee: Oki Electric Industry Co., Ltd., Tokyo, Japan

[21] Appl. No.: 594,737

[22] Filed: July 10, 1975

[30] Foreign Application Priority Data

July 15, 1974  Japan ................... 49-80238

[51] Int. Cl.² .................. G06F 9/20; G06F 15/46
[52] U.S. Cl. ....................... 364/900; 364/107
[58] Field of Search ............ 340/172.5; 445/1; 235/151.1, 151.11, 151; 364/200, 900

[56] References Cited

U.S. PATENT DOCUMENTS

| 3,701,113 | 10/1972 | Chace et al. | 340/172.5 |
| 3,725,652 | 4/1973 | Konvalina | 235/151.11 |
| 3,731,280 | 5/1973 | Shevlin | 340/172.5 |
| 3,744,031 | 7/1973 | Avery et al. | 340/172.5 |
| 3,825,900 | 7/1974 | Anderson | 340/172.5 |
| 3,881,172 | 4/1975 | Bartlett et al. | 340/172.5 |

Primary Examiner—Mark E. Nusbaum
Attorney, Agent, or Firm—Kenyon & Kenyon

[57] ABSTRACT

An improved microprocessor NC comprising a memory storing a control program, general purpose register group means including position registers and command registers which are necessary for carrying out numerical control, a logic-arithmetic operational circuit for conducting logical and arithmetic operations between said registers, servo means controlling a machine tool or the like, and an input means or a switch group which contains necessary information for controlling the machine tool or the like; said control program being successively read out from the memory for effecting the logical and arithmetic operations between the registers, generating a series of command pulses and fulfilling various functions which are necessary for the numerical control. The present NC has also display means for monitoring the operation of the NC unit itself.

3 Claims, 11 Drawing Figures

CONTROL SYSTEM OF A NUMERICAL CONTROL UNIT

BACKGROUND OF THE INVENTION

This invention relates to a system of numerical control unit, and more particularly to a novel and flexible control system based on a programmed control system.

Numerical control techniques are applied to various industrial machines, e.g., lathes, milling machines, machining centers, punching presses, grinding machines, drafters, wiring machines, and gas cutting appratuses. The numerical control units for the industrial machines are required to take a wide variety of different forms, because the functional requirements of the machines to which such units are applied vary vastly; namely, presence or absence of contouring function, presence or absence of feed rate control function in synchronism with the rotation of the main shaft, different specifications for functions of input medium of control information, or the like. For each of such different functional requirements, one logic means is prepared by using logical operational means. Accordingly, the conventional numerical control unit has a critical shortcoming in that a different numerical control unit is necessary for each different machine, so that the design and manufacture of the unit are very complicated, and its production cost is high.

To avoid such shortcoming, a computer numerical control (CNC) has been developed, in which a mini-computer is included for fulfilling the functions of a numerical control unit by the operational functions of the minicomputer. The conventional CNC system, however, has shortcomings in that the mini-computer itself is comparatively expensive, that complicated electric circuit means is necessary for transferring signals between the minicomputer and the external machine tool, and that complicated programs are required. More particularly, the minicomputer is generally organized on the basis of 16 bits per word, and it can treat at most $2^{16}$ bits at a time, while a typical numerical control unit requires an ability of treating more bits at a time (for instance, in the case of a numerical control operation involving a maximum instruction value of 8 meters with a pulse unit of 0.001 millimeter, $2^{24}$ bits should be treated at a time). Thus, the minicomputer in a numerical control system uses complicated programs, e.g., for the operation of interpolation a process involving two divided words is used. As a result, the mini-computer must have a core memory of 8 to 16 KW, and it becomes very expensive.

The numerical control unit is generally required to display the present position of the table of a machine tool being controlled by a suitable display means, such as numeral display tubes. The value of such present position is generally stored in the main memory of the mini computer. In order to extract and display the present positional values of each operating shaft of a machine tool, which values are ever changing at a high speed, interruption or other similar techniques must be used. This causes another shortcoming in that the interruption or the like further complicates the computer circuitly and that operating time for main functions is so interfered with by the interruption or the like that adequate interpolating operations become difficult.

SUMMARY OF THE INVENTION

It is an object, therefore, of the present invention to overcome the disadvantages and limitations of prior NC units by providing new and improved NC units.

The above and other objects are attained by a control system of a numerical control unit comprising: a digital memory for storing a control program; general purpose register group means connected to said memory through a logic circuit, including position registers and command registers which are necessary for carrying out numerical control; a logic-arithmetic operational circuit connected to both the memory and the general purpose register group means through a logic circuit, for conducting logical and arithmetic operations between said registers; servo means connected to said logic-arithmetic operational circuit through a logic circuit for controlling a machine tool; an input means connected to said logic-arithmetic operational circuit through a logic circuit, necessary information for controlling the machine tool, and; said control program being successively read out from the memory (116) for effecting the logical and arithmetic operations between the registers, generating a series of command pulses and fulfilling various functions which are necessary for the numerical control.

BRIEF DESCRIPTION OF THE DRAWINGS

The foregoing and other objects, features, and attendant advantages of the invention will be appreciated as the same become better understood from the following description and the accompanying drawings wherein:

FIG. 6 is a block diagram illustrating a system for displaying the contents of registers in the numerical control unit of FIG. 2 by using numeral display tubes or the like.

DESCRIPTION OF THE PREFERRED EMBODIMENTS

Figure 1A:
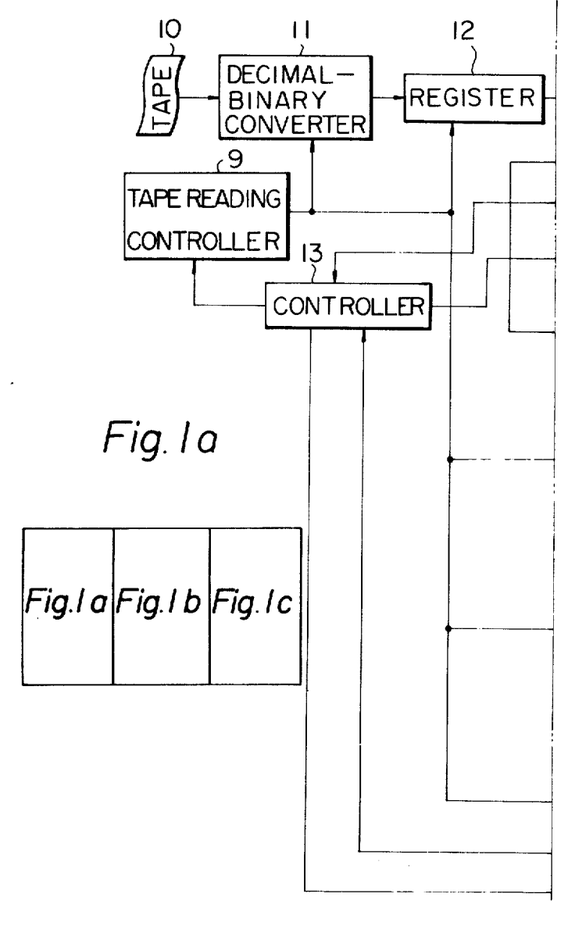
FIGS. 1(a), 1(b) and 1(c) are a block diagram of a conventional numerical control system.
Figure 1B:
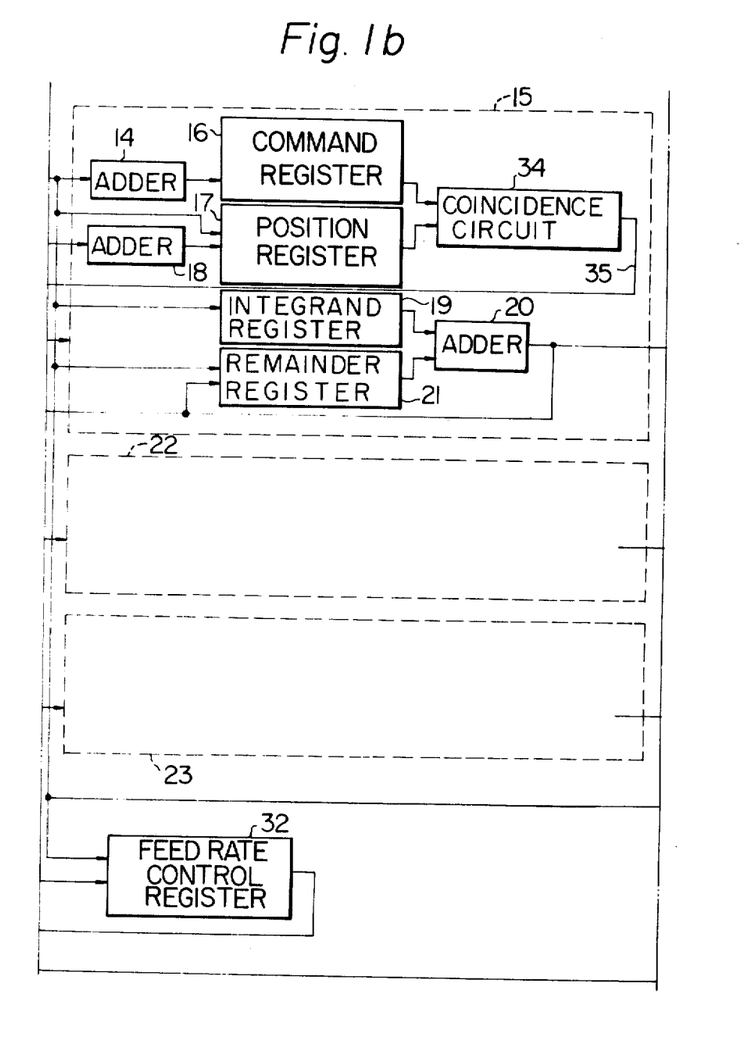
Figure 1C:
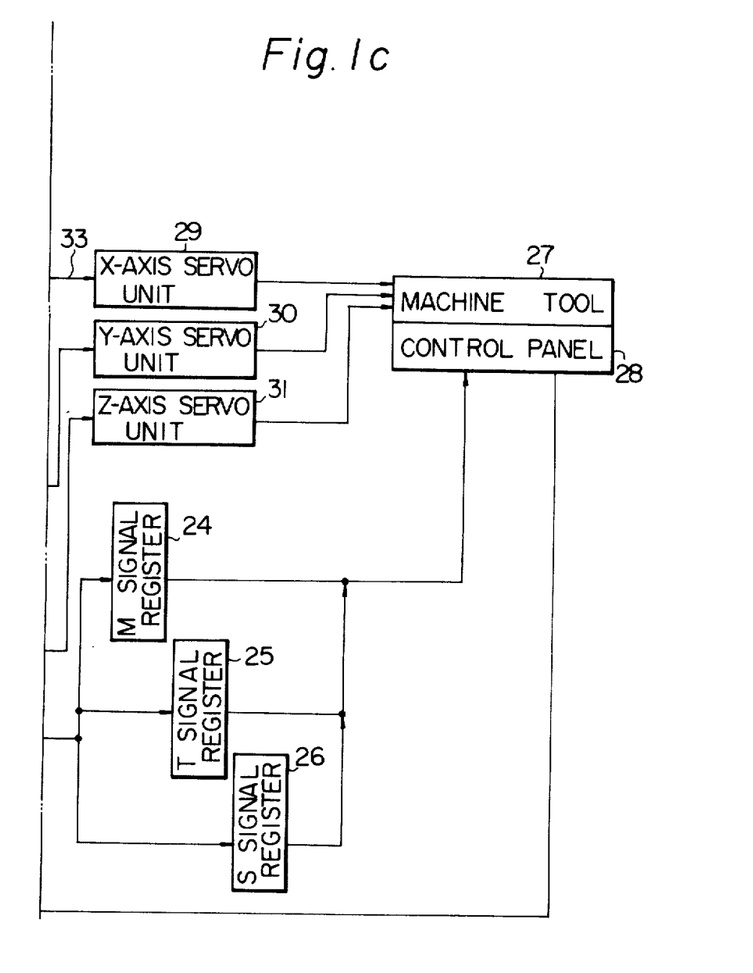

At first, an example of a prior numerical control unit is explained, with reference to FIG. 1, for the easy understanding of the present invention.

Referring to FIG. 1 a controller 13 sends a tape forward start signal to a tape reading controller 9 and, then, successively dispatches control signals to control information transfer berween different registers, namely travelling information of the machine tool 27 are read out from an input tape 10 and converted into binary form by a decimal-binary converter 11 for storing them in an input register 12. For instance, when the command thus read out relates to the X-axis, the command is added into a command register 16 of an X-axis operation circuit 15 through an adder 14 thereof.

If the command from the tape is, for instance, a linear interpolation mode or a circular interpolation mode, numerical values necessary to process the command are read into an integrand register 19.

If necessary, contents of the register 12 are transferred in an M signal (miscellaneous signals, e.g., forward rotation and stopping of a spindle) register 24, an S signal (controls spindle speed) register 26, and a T signal (controls tools selection) register 25. A feed rate control information is read into a feed rate control register 32. After each of the registers stores the control information therein in the aforesaid manner, servo mechanism is controlled by command pulses, the generated rate of which depends on the contents in the feed rate register 32. For instance, when linear interpolation mode is set from the tape 10, the contents of the integrand register 19 is added to the remainder register 21 by the adder 20, so as to generate an overflow pulse at the line 33. The overflow pulse command pulse is applied to both the X-axis servo unit 29 and the position register 17 through the adder 18. The content of the position register 17 is compared with the content of the command register 16 by the coincidence circuit 34, so as to allow the addition of the content of the integrand register 19 to the remainder register 21 until a coincidence signal is delivered to the line 35, for effecting the interpolation. The overflow pulse delivered to the X-axis servo unit 29 actuates a drive motor (not shown) of the machine tool 27, for controlling the table of the machine tool. In addition, the M register 24, the T register 25, and the S register 26 exchange signals necessary for the numerical control, e.g., the start and stop of the spindle of the machine tool, with the control panel 28 of the machine tool.

In such a conventional numerical control unit, each of the different functions uses separate adders and registers (generally, cyclic shift registers are used). For instance, the decimal-binary converter 11 performs multiplication of the already read value with ten and addition of the product to a newly read input, and such multiplication and addition require registers and adders. The X-axis operator circuit 15, Y-axis operator circuit 22, and the Z-axis operator circuit 23 include independent registers, adders, and coincidence circuits, so that considering those axes, more than ten independent registers, adders, and coincidence circuits are used altogether. Of those many registers and adders and coincidence circuits, only a few of them are actually operated at one time, and during that time the rest of them stay idle. For instance, after completion of a decimal-binary converter operation, the adders in the decimal-binary converter 11 remain idle. Similarly, the adder 14 becomes idle after adding the contents of the input register 12 into the command register 16. Thus, with the conventional control system of the numerical control unit, each of the circuit elements must be provided as a constituent element of the unit, regardless of the frequency at which the individual circuit element is actually used. As a result, the circuit is very complicated and voluminous. In FIG. 1, reference numerals 30 and 31 represent a Y-axis servo unit and a Z-axis servo unit, respectively.

Figure 2A:
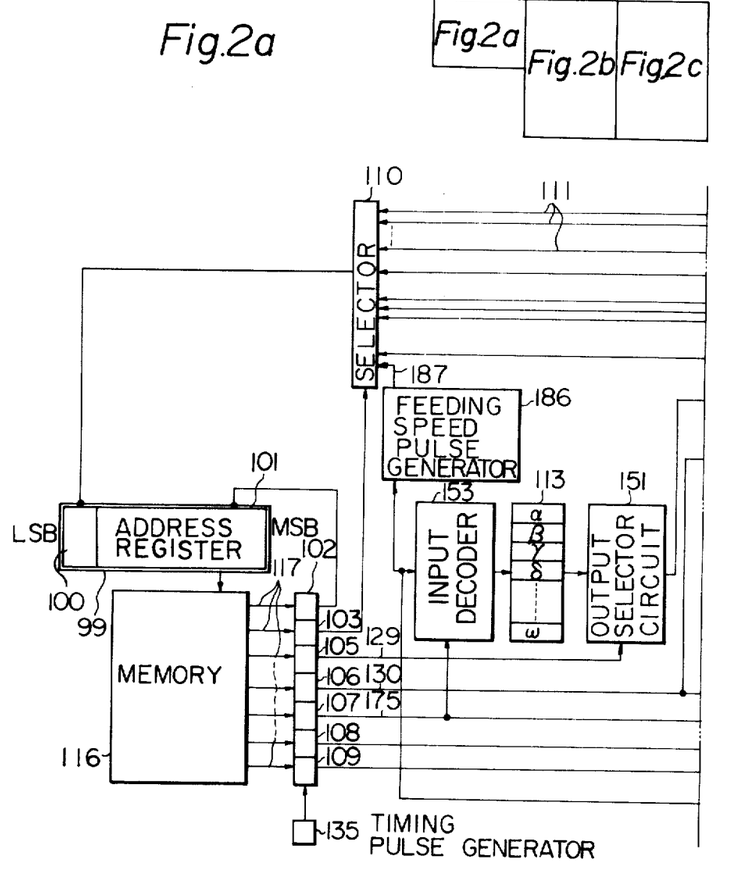
FIGs. 2(a), 2(b) and 2(c) are a block diagram of an embodiment of a control system according to the present invention.
Figure 2B:
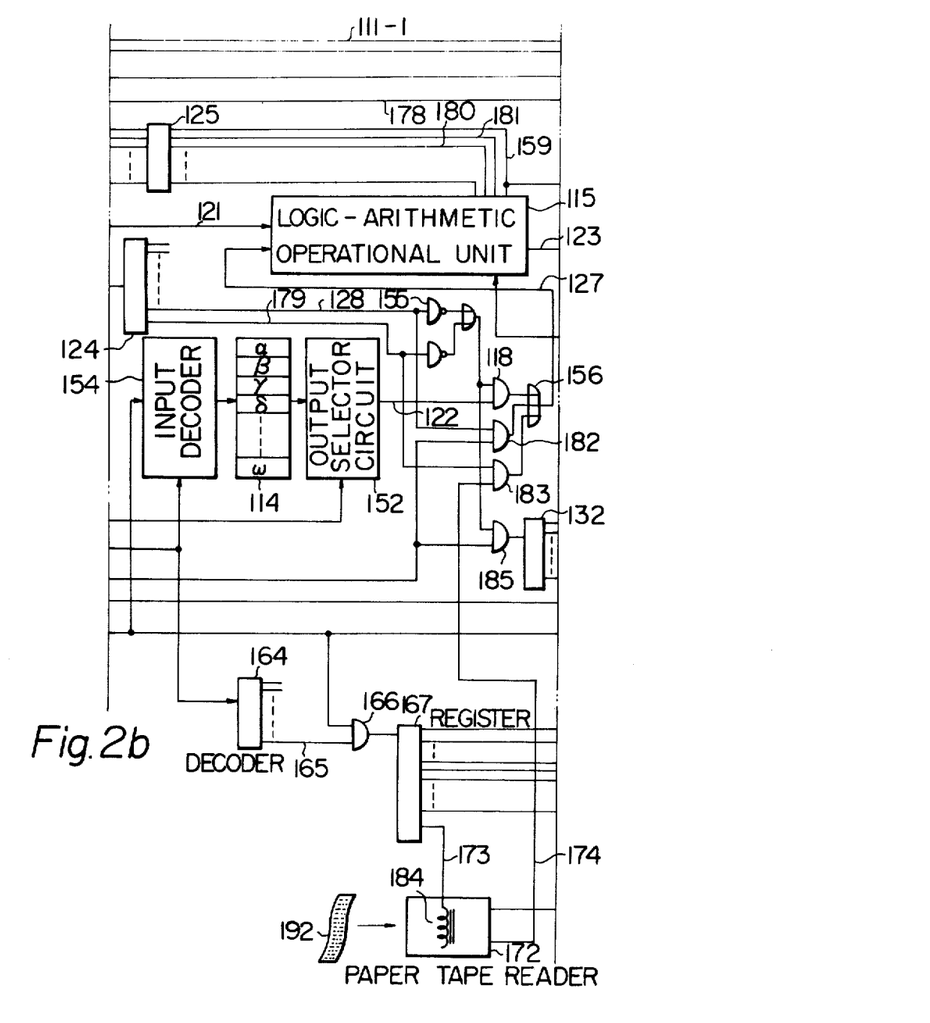
Figure 2C:
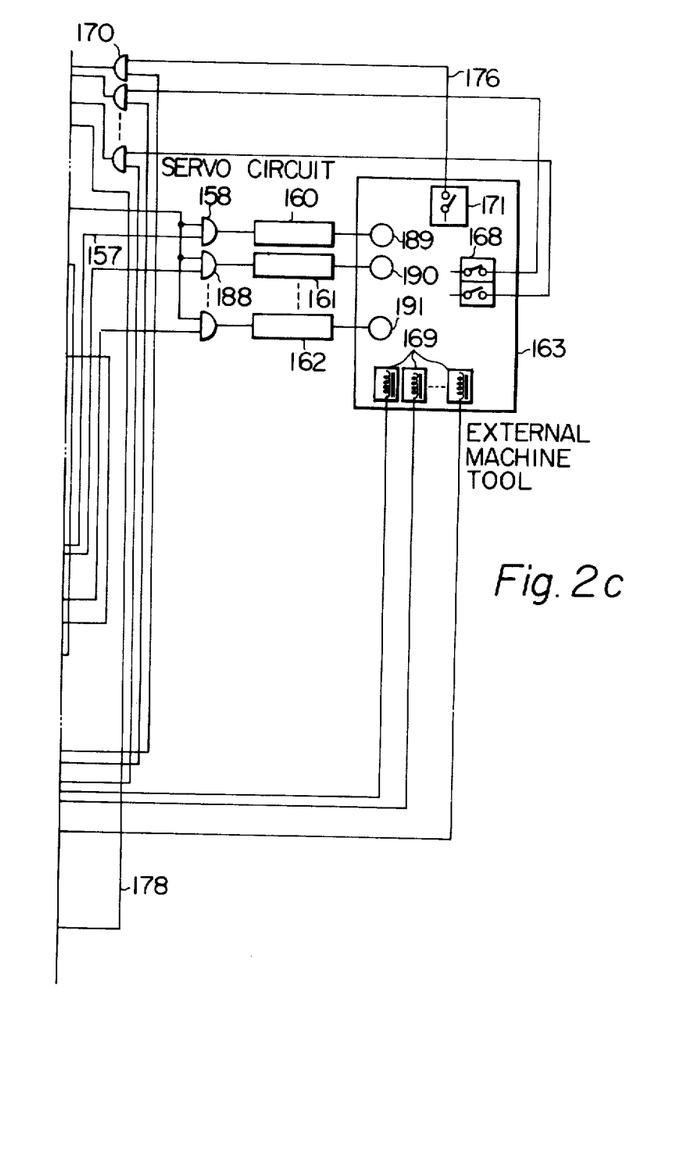

FIG. 2 is a block diagram, showing the outline of an embodiment of the present invention. Control programs are stored in a memory 116. When a start signal (not shown) is applied to the memory, the contents of an initial start address, which address is initially stored in an address register 99, are read out onto lines 117. The contents are set in memory registers 102 through 109 by timing pulses from a timing pulse generator 135. The contents of the memory register 102 represents upper place bits of the memory address to be read out next, except the least significant bit (LSB), and they are connected to the upper place bits portion 101 of the address register 99. The memory register 103 is connected to the selection line of a selector 110. The input to the selector 110 includes line group 111 representing the conditions of the signals and switches in an external machine tool 163, different bits of a register 125, and the output line 187 from a feed rate pulse generator 186. The selection line from the memory register 103 acts to select one of each input in the line group 111 and in the register 125, and according to the condition (1 or 0) of the selected line, a digital value 1 or 0 is sent to the least significant bit (LSB) 100 of the address register 99, which determines the particular address to be read out of the memory 116. Consequently, it becomes possible to generate a conditional jump instruction.

The memory registers 105 and 106 are connected to the output selector circuits 151 and 152 of register groups 113 and 114, respectively. The contents of that one register in the group 113, which is selected by the selector circuit 151, are delivered to a line 121 and directly applied to a logic-arithmetic operational unit 115. On the other hand, the contents of that one register of the group 114, which is selected by the selector circuit 152, are delivered to a line 122 and applied to the logic-arithmetic operational unit 115 through an AND gate 118, an OR gate 156, and a line 127. The memory register 109 is connected to an operation selecting line of the logic-arithmetic operational unit 115, which specifies the type of operation to be performed on the input data from the lines 121 and 127, so as to deliver the outcome of the arithmetic logical operation onto an output line 123.

If the result of the operation includes a carry from the uppermost place, the potential of a line 159 become binary "1" level, while the result of operation that the level becomes zero causes a line 181 to become binary "1" level. The register 125 is set in accordance with the potentials of the lines 159 and 181, so as to determine the address to be executed. The memory register 107 is connected to both decoder/demultiplexer circuits 153 and 154 of the register groups 113 and 114, for specifying that register groups 113 or 114, into which the contents of the output on the output line 123 of the arithmetic-logic unit 115 should be written. The contents of 175 also includes the signal of selecting register group 113 or 114. The output line 175 of the memory register 107 is also connected to a decoder 164. If the potential of specific one of lines 165 become binary "1" level as a result of the decoding at the decoder 164, and if the potential of the output line 123 of the logic-arithmetic operational unit 115 at that moment is such as to enable an AND gate, the AND gate 166 is opened and the output from the logic-arithmetic operational unit 115 is set in a register 167, for actuating the relays or solenoids 169 of the machine tool 163 so as to provide appropriate command to different elements of the machine tool 163. The output from the register 167 is also applied to AND gates 170, for performing such control which leads the information representing the conditions of the switches 171 and the like of the machine tool 163 to the selector 110. For the simplicity of the drawing, only a single set of the AND gate 166 and the register 167 is shown in FIG. 2(b).

Another output line 173 of the register 167 is connected to a paper tape reader 172, so as to energize the magnet 184 of a clutch therein for causing the reader 172 to read out a paper tape 192. The contents of the paper tape 192 are delivered to a line 174 and applied to the logic-arithmetic operational unit 115 through an AND gate 183 and an OR gate 156. The memory register 106 is also connected to the decoder 124. If the potential of a specific line 128 of the output lines of the decoder 124 becomes binary "1" level as the result of the decoding, the content of a selected register of the group 114 does not appear on the line 127, because an AND gate 118 is closed by an inverter 155, and the content of the memory register 108 is directly applied to the line 127, because an AND gate 182 is opened in this case.

Thus, for instance, it becomes possible to directly compare the content of the line 121 and the content of the memory register 108 by the logic-arithmetic operational unit 115, or to selectively store a constant in a desired register of the group 113 or 114 through the logic-arithmetic operational unit 115. The aforesaid control of the register group 114 is also applicable to the register group 113. Since the memory register 108 remains idle unless the line 128 is selected by the decoder 124, the memory register 108 can be used for other purposes through a decoder 132 when the line 128 is not selected, because an AND gate 185 is opened in this case.

and register 125 for producing an input to the lower two places of the address decoder.

The present control system functions to read a program tape, calculate the interpolation, process the thumb-wheel switch, process the signal of a limit switch concerning the stroke-end, and/or process the M signal concerning the exchange of a tool.

Some examples of the operation of the present control system will now be explained. Referring to FIG. 2, let us take an example in which a start signal is delivered from the machine tool 163 and the paper tape reader 172 reads the paper tape 192 (the input is not restricted to paper tape, but it can be supplied by switches). When a start switch 171 mounted on the machine tool 163 is depressed, a start signal generates and passes through a line 176 and an AND gate 170 (provided that the AND gate 170 is open at this time by a separate means), so as to make the potential of one line 111-1 of the group 111 to binary "1" level.

The control program stored in the memory 116 at this moment is assumed to be as shown in Table 1. (The addresses A, B, C, ... are assumed to be even numbered in the Table.). At first, the contents of the address A are read into the memory registers 102 to 109, and the line 111-1 is selected in response to the contents of the memory register 103. Since the line 111-1 carries a binary "1" at this moment, the memory register 100 becomes "1", and the next address to be executed becomes A + 1.

Table 1

| Storing address of control program | Memory register No. | | | | | | |
|---|---|---|---|---|---|---|---|
| | 102 | 103 | 105 | 106 | 107 | 108 | 109 |
| A | Go to A | Select line 111-1 | not used (470) | not used (475) | Not used | Not used | Not used |
| A+1 | Go to B | Not used | Not used (471) | Select line 128 | Select line 165 | Select line 173 at "1" for driving paper tape reading | Directly extract contents of line 127 to line 123 |
| B | Go to B | Select line 178 | Not used (472) | Not used (474) | Not used | Not used | Not used |
| B+1 | Go to C | Not used | Not used (473) | Select line 179 | Select register address 113 α | Not used | Directly extract contents of line 127 to line 123 |
| C | Go to D | Select line 180 | Select address α | Select line 128 | Not used | Give output code "X" | Check coincidence between lines 127 and 123 |
| D | Go to E | Select line 180 | Select address α | Select line 128 | Not used | Give output code "Y" | Check coincidence between lines 121 and 127 |
| D+1 | | | | | | | |
| E | | | | | | | |
| E+1 | | | | | | | |
| : | | | | | | | |

More particularly, an output line 157 of the decoder 132 is connected to an AND gate 158. Accordingly, if the output line 157 of the decoder 132 is selected when the operational unit 115 produces a carry on the line 159, an AND gate 158 is opened for delivering an overflow pulse to an X-axis servo unit 160 and driving a servo motor 189 mounted on the machine tool 163.

Although the lower one bit of the next address to be executed is selectively determined in the foregoing description, it is also possible to use two conditions for determining the next address to be executed by providing another set of elements corresponding to the aforesaid memory register 102, selector 110, line group 111, The contents of the address A+1 are read into the memory register 108, so as to make the potential of the driving line 173 of the paper tape reader 172 binary "1" level. Since the line 128 is so selected as to open the gate 182, the contents of the memory register 108 are directly transferred to the line 127, and the contents of the line 127 are directly delivered to the output line 123 of the logic-arithmetic operational unit 115.

Since the line 165 is selected, the contents of the line 123 are directly set in the register 167, and the potential of its output line 173 becomes binary "1" level. Thus, the tape reader 172 is actuated and the next address to be executed becomes the address B.

At the address B, the signal line 178 for the sprockets of the paper tape 192 is selected by the selector 110, and the control remains at the address B until the sprocket signal becomes binary "1".

Figure 3:
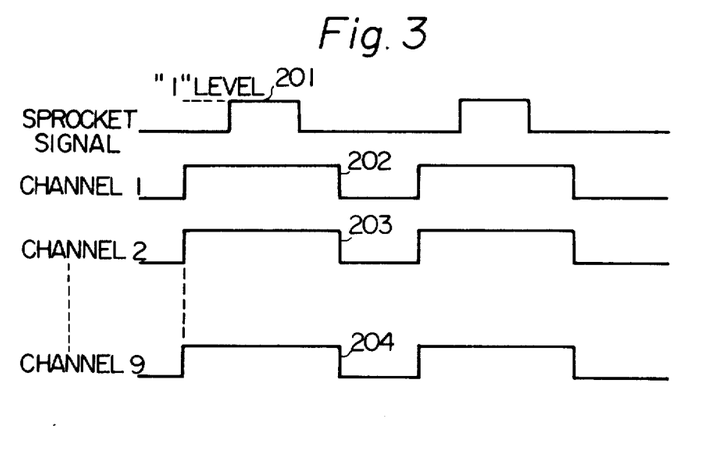
FIG. 3 is a diagrammatic illustration of the output signals from different channels of a paper tape reader.

When the sprocket signal 201 becomes binary "1", as shown in FIG. 3, the control moves to the step of B+1 address. The address B+1 is a step in which different channel outputs 202, 203, and 204 of the paper tape reader, as delivered to the line 174 as shown in FIG. 3, are stored in the registers at the addresses α of the register group 113.

More particularly, since the line 179 is selected, the gate 183 is open, the outputs from the paper tape reader 172, as delivered on the line 174, are applied to the logic-arithmetic operational unit 115 through the line 127 and directly delivered to its output line 123. On the other hand, the addresses α of the register group 113 are selected, so that the contents of the line 123 are stored in the addresses α. Thus, the information which is read out by the paper tape reader 172 is stored at the addresses α.

The next address C to be executed is a step to determine what the information thus read out is. Since the format of the paper tape, which is used for numerical control, is generally X200, Y100, CR or so, the address C of Table 1 shows an example of determining whether or not the information read out is X, where X200 means to move in the direction by 200 pulses Y100 means to move in the Y direction by 100 pulses, and CR is a carriage return.

To this end, an "X" code is produced from the memory register 108, so as to compare the contents of the addresses α with the code by the logic-arithmetic operational unit 115 (exclusive OR). If they coincide, the potential of the line 180 becomes binary "1" level for proceeding to the address D+1, while if they do not coincide, the address D is executed next. Thus, the aforesaid determination can be accomplished easily.

In the succeeding program, if the "X" information is detected in the step of the address C, the step of the address D+1 performs the formation of a flag bit representing "X" in the register group 113 or 114 and other related operations, and causes a jump to the address A for reading a next character by the paper tape reader 172, and then repeats similar operational steps. On the other hand, the address D contains a step for detecting "Y" and another step of determining whether a numeral follows or not. Based on the foregoing description, it will be apparent to those skilled in the art that, when numerals are read in, the decimal-binary conversion can be easily carried out in the system by using the logic-arithmetic operational unit 115 and the register groups 113 and 114, and that the paper tape reader 172 can be easily stopped upon reading the CR code.

The next example is a process of generating a series of command pulses (interpolating process), which command pulses are applied to servo units 160, 161, and 162 for moving the different shafts of the machine tool 163.

FIG. 4(a) is a conceptional block diagram of two-axes (e.g., X-axis and Y-axis) linear interpolation of the known digital differential analyzer (DDA) system. A block 301 represents a register storing the amount of movement in the X-axis direction, and a block 306 represents a register storing the amount of movement in the Y-axis direction. Blocks 302 and 305 represent adders, a block 309 represents a feed rate control pulse generator, and blocks 307 and 308 represent an X-axis servo circuit and a Y-axis servo circuit, respectively. Blocks 303 and 304 represent registers. When the feed rate control pulse generator 309 generates feed pulses, the contents of the register 301 and the contents of the register 306 are added to the registers 303 and 304 by the adders 302 and 305, respectively. As a result of the addition, if a carry or carries are produced at the highest places of the registers 303 and 304, such carries are applied to the X-axis servo circuit 307 and Y-axis servo circuit 308, as the command pulses thereof, respectively. Accordingly, an X-axis driving motor 310 and a Y-axis driving motor 311 are actuated.

It is well known to those skilled in the art that, when an X-axis displacement 321 and a Y-axis displacement 322 are given, the machine tool can be controlled in the direction of the synthesized vector 320 of the two displacements as shown in FIG. 4(b).

Let it be assumed now that the aforesaid command X200, Y100, and CR are read by the paper tape reader 172 with the programs of Table 1, and stored in the register groups 113 and 114 of FIG. 2. The allocation of the addresses of the register groups 113 and 114 for different functions is assumed to be as follows.

Figure 4:
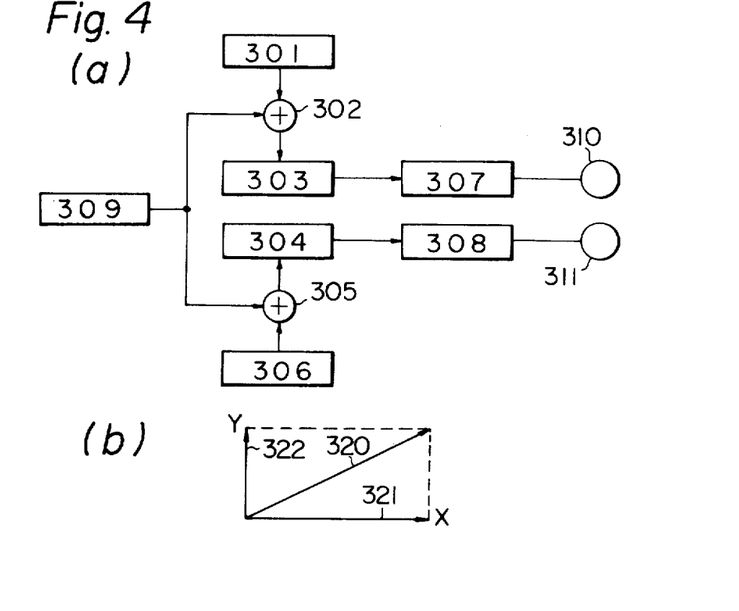
FIG. 4(a) is a block diagram illustrating the concept of two-axes linear interpolation of a known digital differential analyzer system (DDA)
FIG. 4(b) is a graph showing operation of the interpolation of FIG. 4(a)

| | |
|---|---|
| Storing position of X-axis displacement (corresponding to 301 of FIG.4 (a)) | ...113 α |
| Reminder register for X-axis (corresponding to 303 of FIG.4(a)) | ...114 α |
| X axis position register | ...113 γ |
| Storing position of Y-axis displacement (corresponding to 306 of FIG.4(a)) | ...113 β |
| reminder register for Y-axis (corresponding to 304 of FIG.4(a)) | ...114 β |
| Y-axis position register | ...114 γ |

Figure 5:
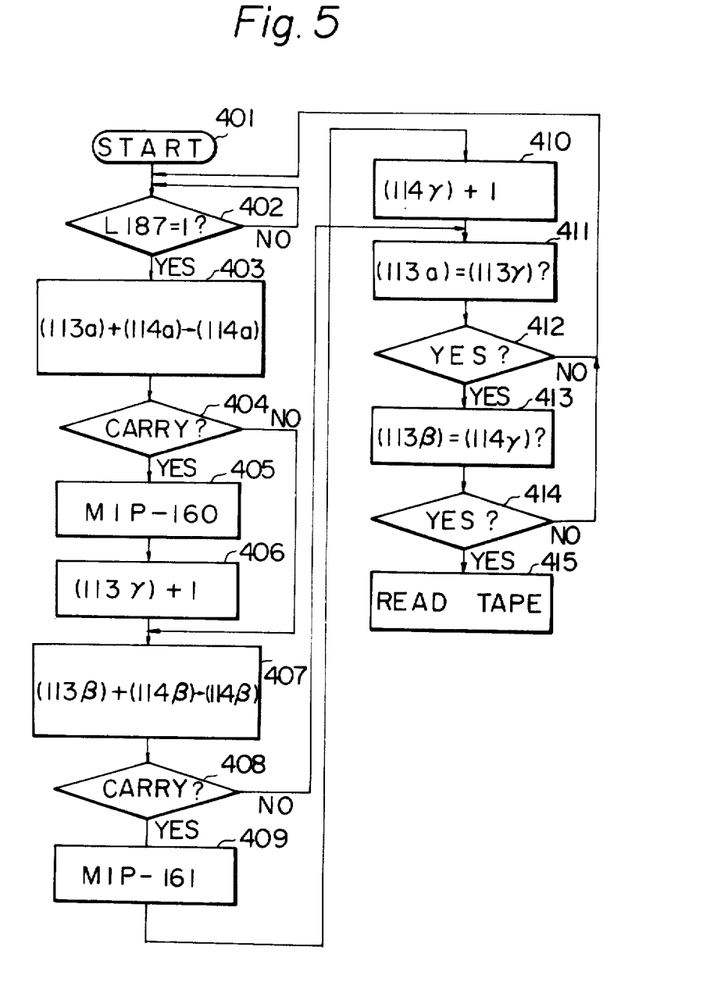
FIG. 5 is a flow chart of control program for generating command of linear interpolation to be performed in the numerical control unit of FIG. 2.

FIG. 5 is a flow chart of a control program for generating command pulses in the circuit of FIG. 2, by linear interpolation. The linear interpolation begins by reading the first step of the control program, as represented by a block 401, into the memory registers 102 through 109. The feed rate data controlling feed rate control pulse generator 186 is read beforehand, from the tape reader into a register provided therein. The step, as represented by a block 402, is to wait until the output line 187 of the feed rate control pulse generator 186 becomes binary "1" level. When the output line 187 becomes binary "1" level, the control moves to the next step, as represented by a block 403, wherein the content of the register address 113 α (carrying an X-axis command) is added to the content of the register address 114 α (the reminder register for X-axis) by the logic-arithmetic operational unit 115, and the sum is stored in the register address 114 α. The next step, as represented by a block 404, determines whether the result of the addition in the step 403 produced a carry or not. If there was a carry, the control moves to the step, as represented by a block 405, so as to open the gate 158 for applying the carry to the X-axis servo unit 160 as a command pulse therefor. Whereby, the X-axis servo motor 189 is driven.

In the step, as represented by a block 406, +1 is added to the contents of the register address 13 (the X-axis position register) for updating the position, and then the control proceeds to the step of a block 407. When no carry is found in the step of block 404, the control jumps to the step 407. The step 407 through 410 perform the same functions on the Y-axis as those performed on the X-axis by the steps 403 through 406.

A block 411 represents a step for determining whether the contents of the register address 113 γ (X-axis displacement) coincides with the contents of the register address 113 γ (X-axis command register) by the logic-arithmetic operatonal unit 115. In a coincidence detecting step, as represented by a block 412, if the line 180 is at binary "1" level, showing the presence of the coincidence between the contents of the register addresses 113 α and 113 γ, the control moves to steps of blocks 413 and 414 for similarly checking the coincidence between the Y-axis move instruction value and the Y-axis present value. When no coincidence was found in the step 412 or 414, the control returns to the step 402 for repeating the aforesaid operations. The detecting of the coincidence between the contents of the addresses 113 α and 113 γ means that the displacement of the machine tool has been completed. Accordingly, after such a detection, the control moves to the next step, as represented by a block 415, for reading the succeeding command on the tape 192.

The aforesaid control for linear interpolation, as illustrated in the flow chart of FIG. 5, has an advantage in that, having such a flow chart, those skilled in the art can easily modify the actual steps, as shown in Table 1, without necessitating detailed knowledge of complicated programming techniques. Although the process of the interpolation for X-axis and Y-axis has been described, it is apparent that the process can be similarly applied to the interpolation of three axes, i.e., X-, Y-, and Z-axes, and to the interpolation of arbitrary axes. Furthermore, the interpolation is not restricted to the aforesaid DDA, but other kinds of interpolation can be used in the system according to the present invention. In addition to the above described examples of reading the command by the paper tape reader and linear interpolation, with the control system according to the present invention, it is also possible to control the conventionally relay-operated internal control sequences of the machine tool 163 by preparing suitable control programs, because the conditions of the machine tool 163 as represented by the conditions of the switches 168 can be used as branching conditions for the control program and the solenoids 169 and the like for regulating the machine 163 can be directly controlled by the register 167. Thus, the control of the machine tool can be simplified by eliminating relays therefrom.

In the above described system, the size of the register groups 113 and 114 can be selected arbitrarily. For instance, in the case of a maximum instruction of about 3 meters with a pulse unit of 0.001 millimeter, it is necessary to handle $1^{24}$ bits. With a recently developed random access memory (RAM) using integrated circuits, a register can be formed easily, independently of the number of constituent bits. The formation of the control system using the integrated circuit RAM has an advantage in that it is less expensive than the conventional control system using separate registers formed of shift registers, and that each register in the register groups can be used as a general purpose register. After being used for one purpose, the general purpose register can be used for another purpose, provided that it is idle then. Thus, the number of the registers can be reduced by developing a suitable program. Therefore, considerable economic saying can be achieved by the control system according to the present invention using the integrated circuit RAM.

Figure 6A:
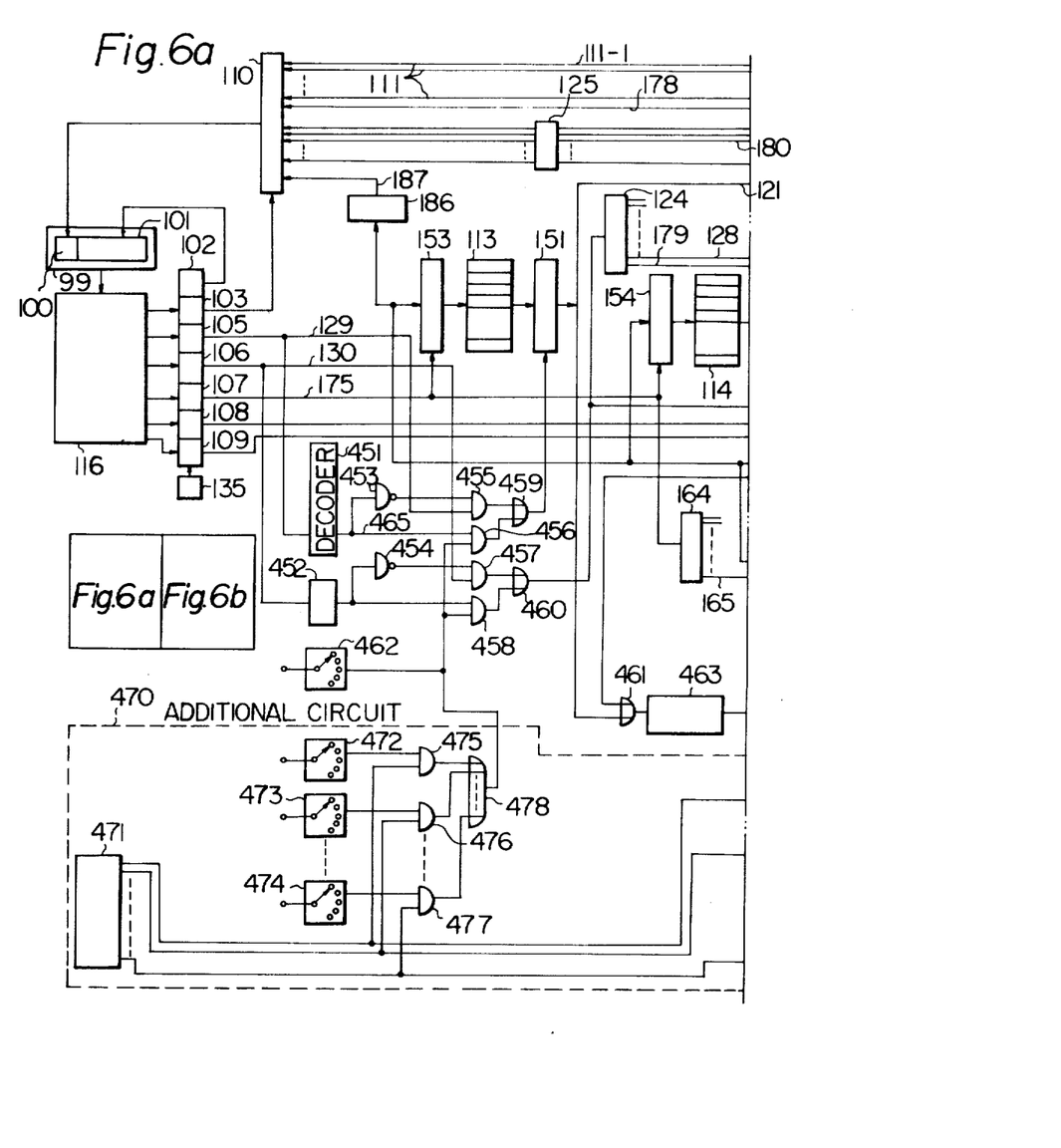
Figure 6B:
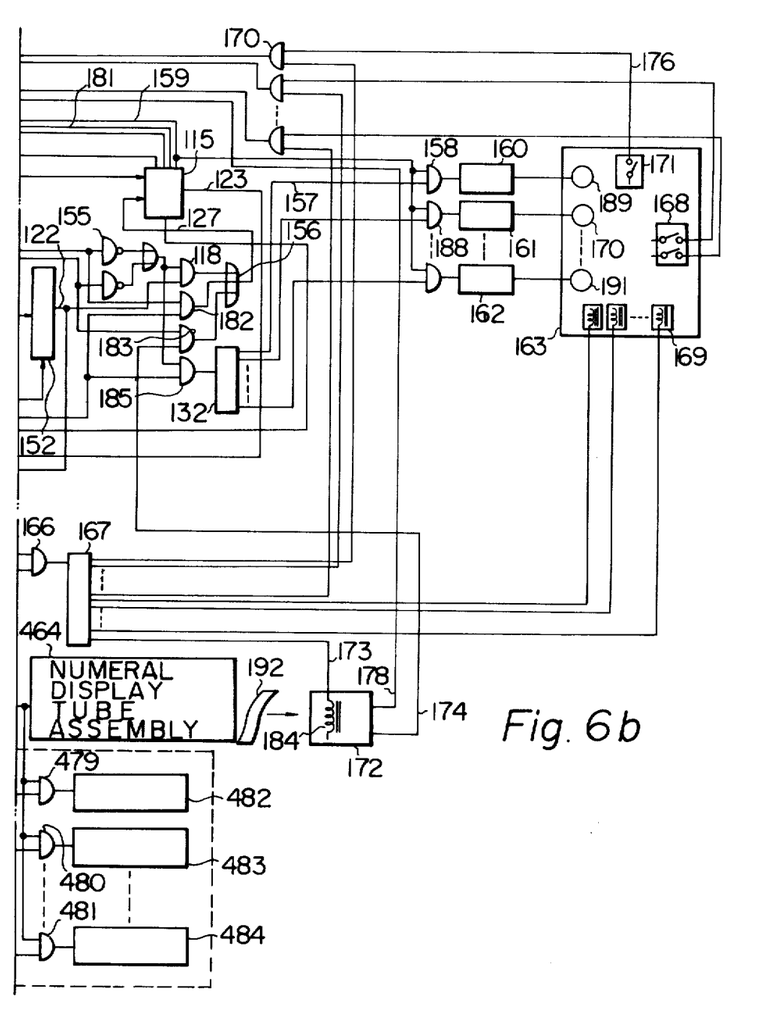

The inventors noted next that a numerical control unit requires visible display of the present position of a machine tool able or the likely, for instance, numeral display tubes. FIG. 6 illustrates a system for displaying the contents of registers of the groups 113 and 114 of FIG. 2, by using numeral display tubes or the like.

In FIG. 6, a decoder 451 is connected to a memory register 105, for detecting the time at which the output selector circuit 151 of the register group 113 is not used, i.e., detecting the "not used" conditions by devices 470, 471, 472, and 473, as shown in Table 1. The details of the devices 470, 471, 472, and 473 will be described hereinafter.

Another decoder 452 detects the time at which the output selector circuit 152 of the register group 114 is not used. For instance, devices 475 and 474 (to be described in detail hereinafter) of FIG. 6 detect the non-used condition. The reference numerals 453 and 454 represent inverters; reference numerals 455, 456, 457, and 458 represent AND gates; reference numerals 459, 460, and 461 represent OR gates; reference numeral 462 represents a selector switch; reference numeral 462 represents a binary-decimal converter circuit, and; reference numeral 464 represents a numeral display tube assembly.

It is assumed that the contents of the register address 113 γ (wherein the X-axis position was stored in the aforesaid example of interpolation) are to be displayed on the numeral display tube assembly 464. During the process of executing the control program, there must be a time period in which the register group 113 is not used. When the register group 113 is idle, the output line 465 of the aforesaid decoder 451 becomes binary "1" level, so that the AND gate 456 is open and the contents of the selector switch 462 (the register address 113 γ is preselected at this switch by using the contents of the memory register 105 through a similar selecting method) are applied to the output selecting circuit 151 through the OR gate 459. Whereby, the contents of the register address 113 γ are extracted and converted by the binary-decimal converter circuit 463 and displayed at the numeral display tube assembly 464.

At this moment, the line 465 is at binary "1" level, and the output from the inverter 453 acts to prevent the contents of the line 129 from passing through the AND gate 455. When the line 465 is not at binary "1" level, the AND gate 455 is open and the content of the line 129 is allowed to pass to the output selector circuit 151 for carrying out the regular operations.

The display of the contents of the register 114 is effected similarly, by detecting the aforesaid non-use condition. When the internal operation is carried out on the decimal basis, the binary-decimal converter 463 can be dispensed with. Thus, only by adding a very simple circuit, the contents of a desired register can be displayed upon specifying that register on the selector switch 462 without interrupting the control program.

Furthermore, it is often required for a numerical control unit to display the present values of each axis separately. To this end, an additional circuit with display means can be added, such as circuit elements enclosed by the dotted lines in FIG. 6. In the figure, reference numeral 482, 483, and 484 represent numeral display tube assemblies for separate indications of each axis present value; reference numerals 479, 480, 481, 475, 476, and 477 represent AND gates; reference numeral 478 represents an OR gate; reference numerals 472, 473, qnd 474 represent selector switches, and; reference numeral 471 represents a display switching signal generator.

When the display switching signal generator 471 is so operated as to suitably select the selector switches 472, 473, and 474 and to switch the numeral display tube assemblies 482, 483, and 484, then, the contents as selected by the selector switches 472, 473, and 474 are displayed on the separate numeral display tubes, respectively.

As described in the foregoing disclosure, in contrast to conventional numerical control units which use various elements specially designed and manufactured for each different machine tool, the numerical control unit according to the present invention can fulfill a wide variety of functions by controlling hardware motions simply by replacing control programs written in a simple fashion without necessitating any circuit modifications. Furthermore, with the numerical control unit according to the present invention, a comparatively large number of registers in a conventional numerical control unit, which are used for each of the different axes, are collected into one or more groups of integrated circuit registers. With the numerical control unit according to the present invention, various operational and functional devices of the conventional numerical control unit, such as adders, coincidence circuits, carry detectors, and the like, which are provided for each of different axes and different functions, are collected in one logic-arithmetic operational unit of integrated circuit. As a result of this, the cost of hardware is considerably reduced.

The control system according to the present invention does not use any expensive apparatuses, such as electronic computers, but the control system is made of integrated circuits, such as register groups, the logic-arithmetic operational unit, the control program memory, and the like. The control program to be used in the system according to the present invention has an advantage in that it is not so sophisticated as the programs of electronic computers using interruption technique and, hence, it can be written easily by those skilled in the art, as shown in Table 1 and FIG. 6.

With a numerical control unit manufactured by using the control system according to the present invention, not only is the manpower for designing electronic circuitry saved, but also manpower for maintenance can be saved because the circuits thereof can be standardized. In short, with the present invention, it becomes possible to provide an inexpensive and highly flexible numerical control unit.

Finally, the numerical control unit described in this specification has been sold by the present applicant under the trade name "OKIPATH 660" since October 1974.

What is claimed is:

1. A control system of a numerical control unit for use in controlling a machine tool having a plurality of control switches associated thererwith, said control system comprising:

a digital memory for storing a control instructions program;

means for reading out for execution control instructions of said control instructions program, from said digital memory;

a plurality of memory registers responsive to said means for reading out for storing a plurality of said control instructions;

a plurality of register groups for storing sets of data for numerical control;

at least one selector circuit connected between particular memory registers and a particular register group for selectively transferring data to a said particular register group;

a logic arithmetic operational unit for selectively receiving data from particular portions of said register groups and for carrying out arithmetic operation in accordance with instructions in the memory registers;

servo mechanism means connected to the output of said logic arithmetic operational circuit and memory registers for controlling said machine tool in accordance with instructions in the memory registers;

an address register for providing address information to said memory;

and a selector means responsive to said arithmetic operational unit and being further responsive to the condition of signals and switches in said machine tool for determining in combination with the information stored in a particular one of said memory registers, the address of the control instructions to be next executed.

2. A control system in accordance with claim 1 and further comprising:

a display means;

detector means for determining the non-accessed condition of each of said register groups;

a further selector means for selecting a register address of said register groups whose content is to be displayed;

output selector and switch means responsive to said detector means and said further selector means for coupling the contents of the register address selected by said further selector means to said display means when said detector means determines that the register group having said register address is in a non-accessed condition.

3. A control system in accordance with claim 1, wherein the output signal from said selector means is applied to the least significant bit position of said address register so as to effect an address modification.

* * * * *

UNITED STATES PATENT AND TRADEMARK OFFICE
CERTIFICATE OF CORRECTION

PATENT NO. : 4,060,851
DATED : November 29, 1977
INVENTOR(S) : Kazuo Nakatsukasa, et al Page 1 of 2

It is certified that error appears in the above-identified patent and that said Letters Patent are hereby corrected as shown below:

In the Abstract:

Line 1 should read as follows:

--An improved NC microprocessor comprising a memory--.

Col. 2, lines 67-68, change "operation" to --operator--.

Col. 3, line 9, change "tools" to --tool--.

Col. 3, line 51, change "converter" to --converting--.

Col. 8, line 58, change "13" to --113--.

Col. 8, line 66, change "113/" to --113 a--.

Col. 9, line 1, correct spelling of "operational".

UNITED STATES PATENT AND TRADEMARK OFFICE
CERTIFICATE OF CORRECTION

PATENT NO. : 4,060,851
DATED : November 29, 1977
INVENTOR(S) : Kazuo Nakatsukasa, et al It is certified that error appears in the above-identified patent and that said Letters Patent are hereby corrected as shown below:

Col. 9, line 60, change "saying" to --saving--.

Col. 9, line 65, change "able" to --table--.

Col. 10, line 62, correct spelling of "and".

Signed and Sealed this

Fourth Day of April 1978

[SEAL]

Attest:

RUTH C. MASON
Attesting Officer

LUTRELLE F. PARKER
Acting Commissioner of Patents and Trademarks